Nov. 28, 1961  J. C. SKAKEL ET AL  3,010,232
EXCAVATING, DREDGING, RAISING, AND TRANSMITTING
EARTHY AND OTHER LOOSE MATTER
Filed Oct. 8, 1959  7 Sheets-Sheet 5
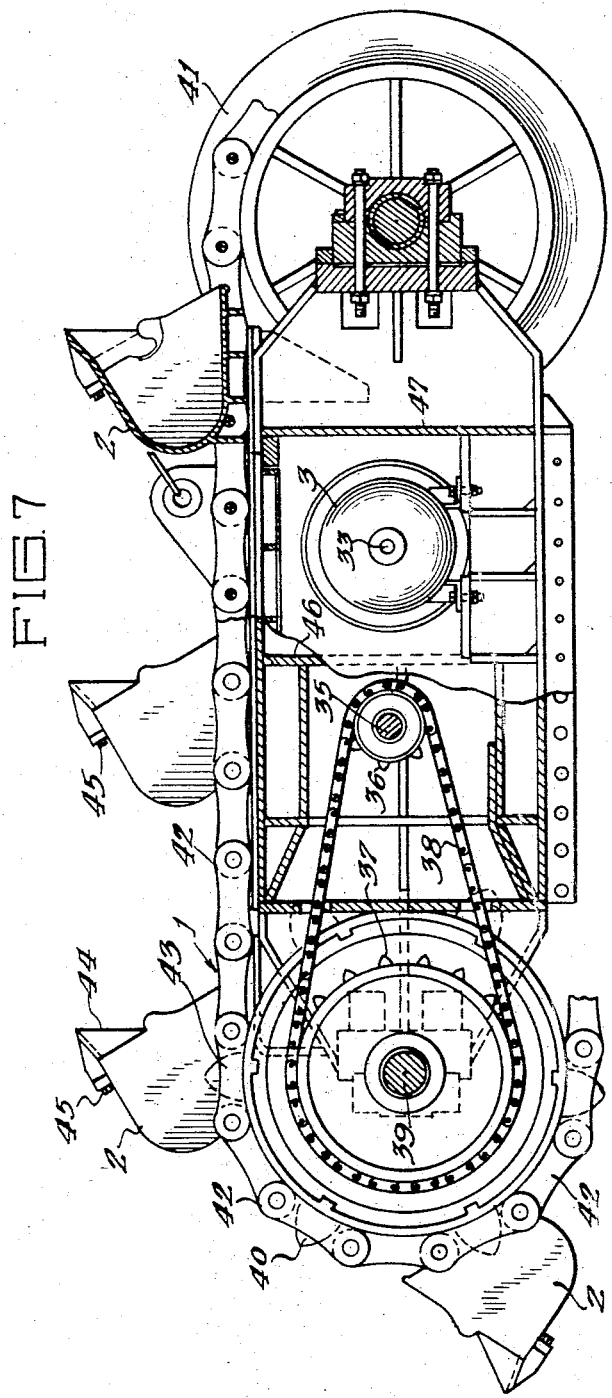
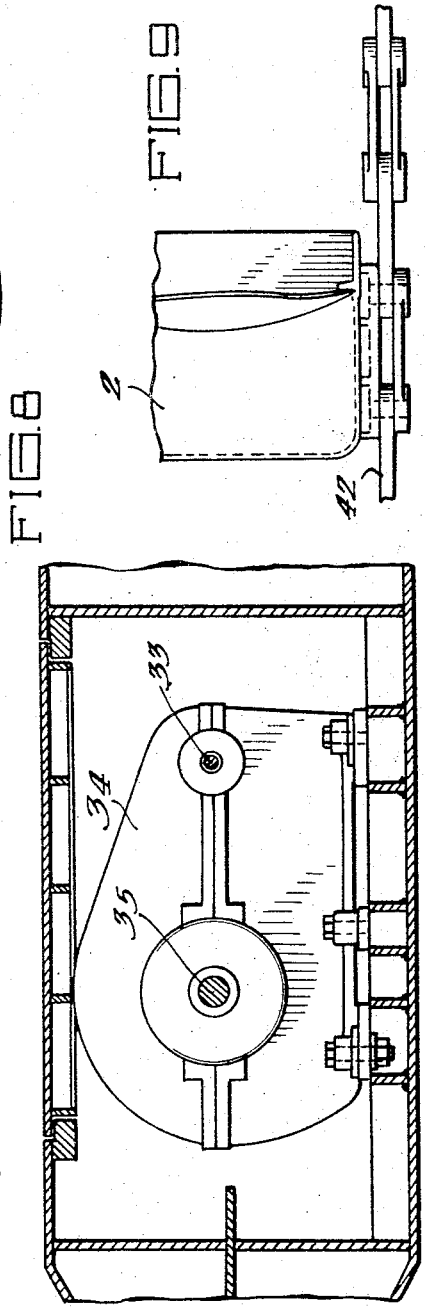
Inventors:
Jack A. Smith
James C. Skakel
By: Earl F. Peters
Attorney

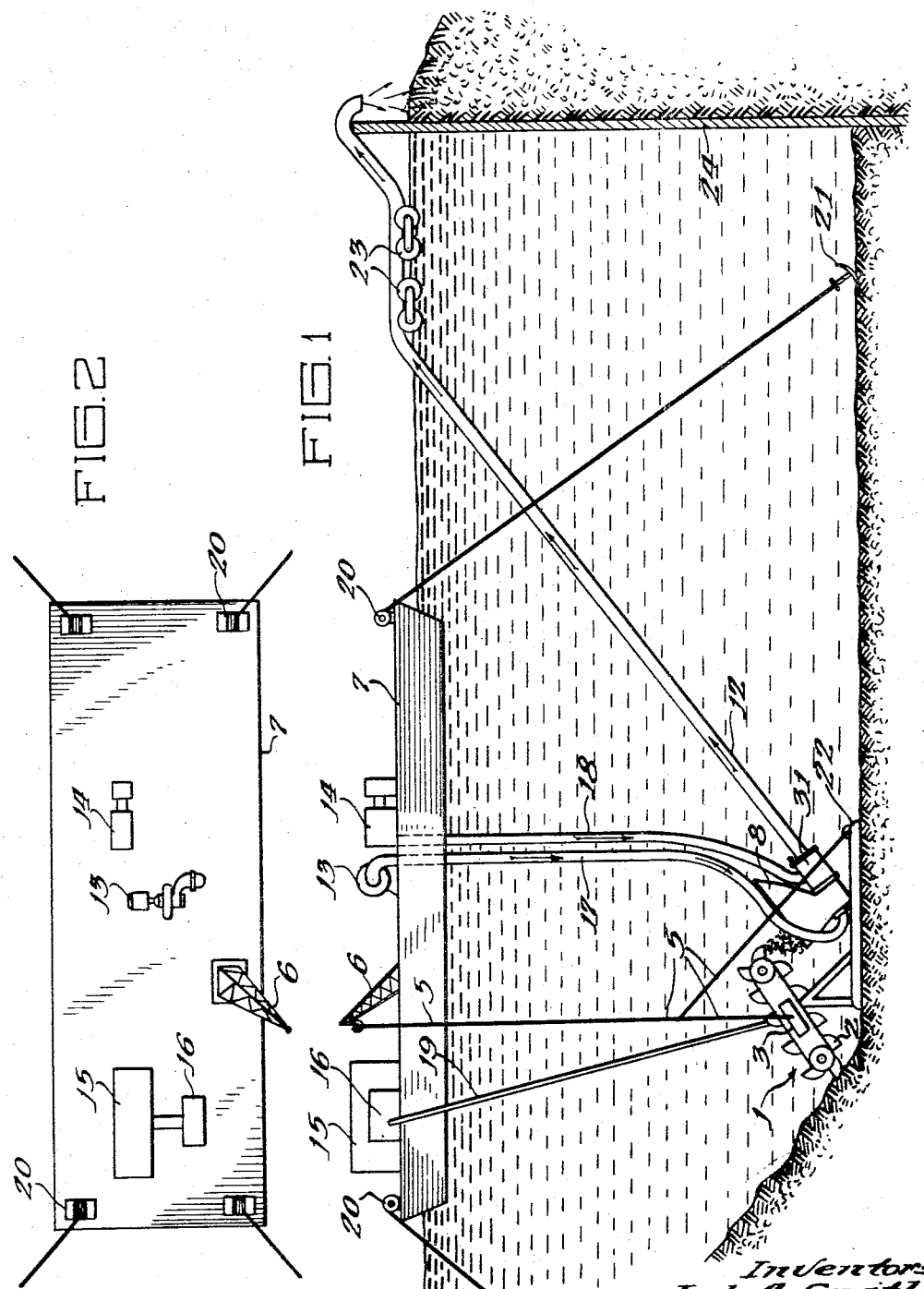

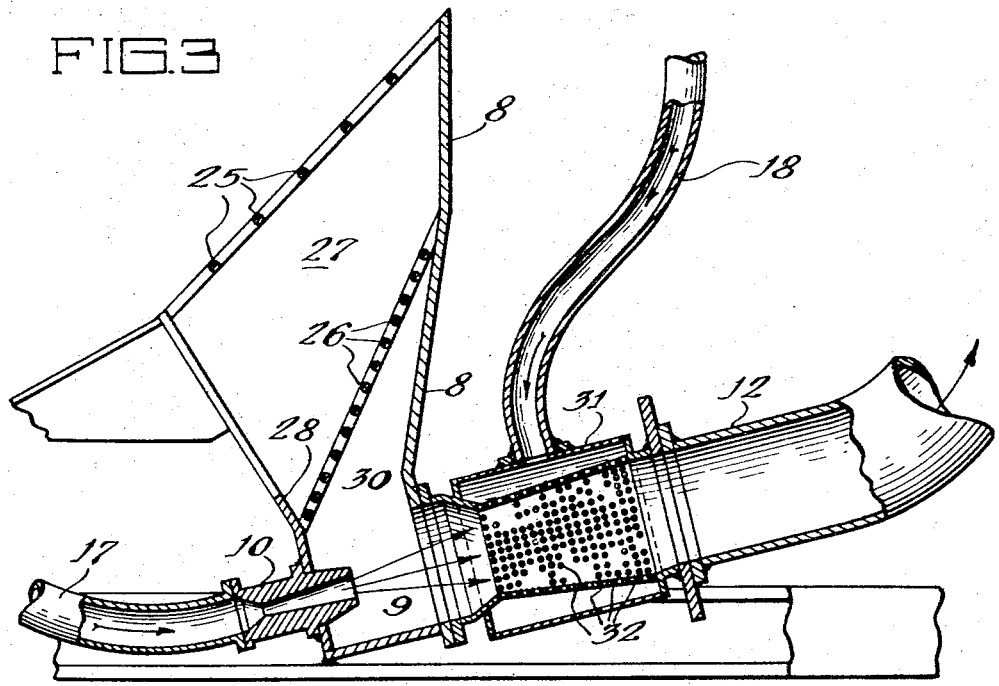
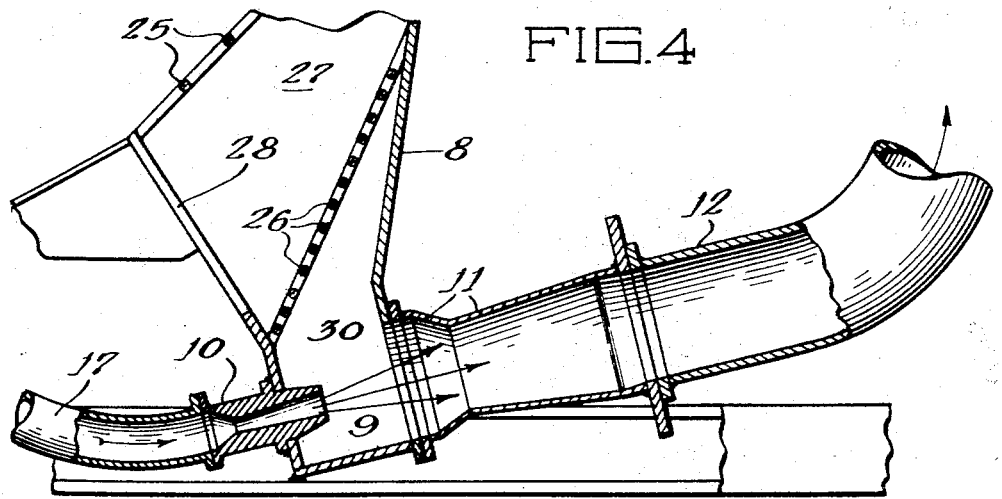

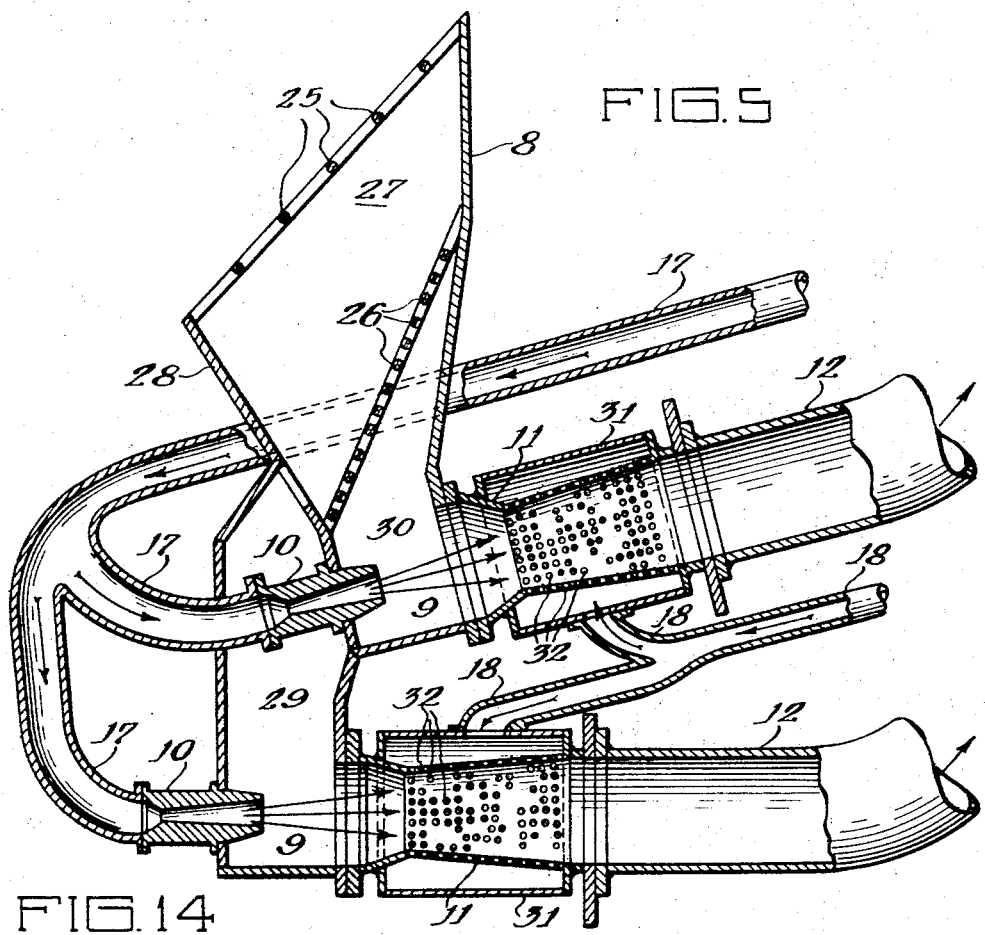
FIG.5
FIG.14
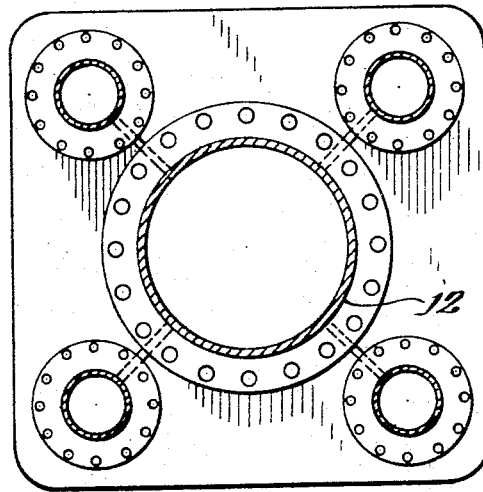
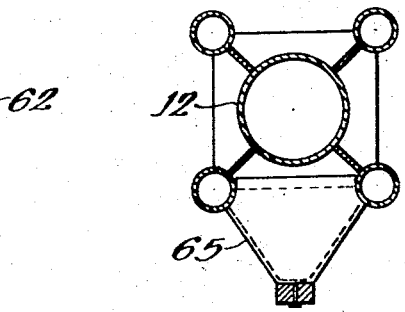
FIG.15
Inventors:
Jack A. Smith
James C. Skakel
By: Carl F. Peters
Attorney

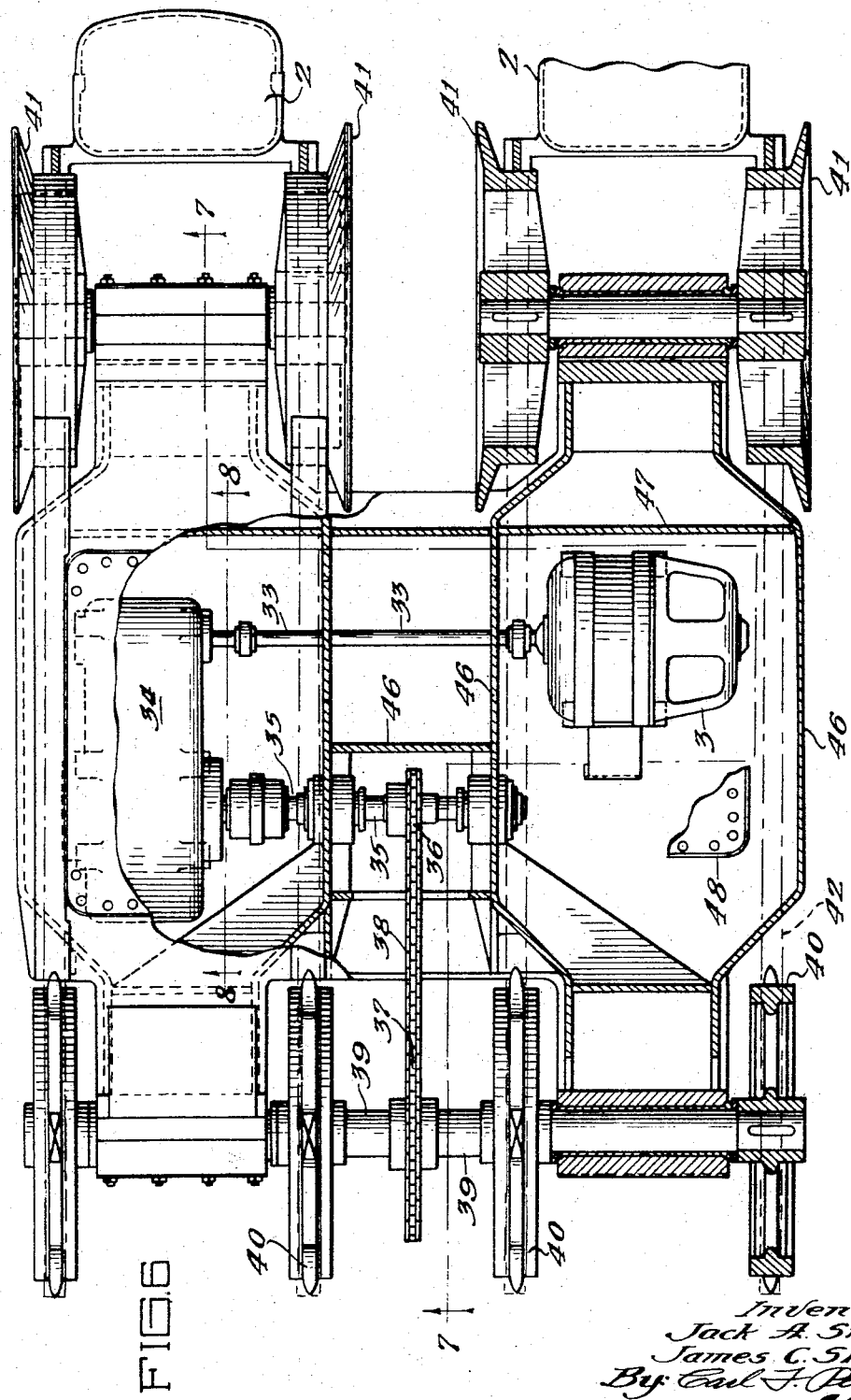

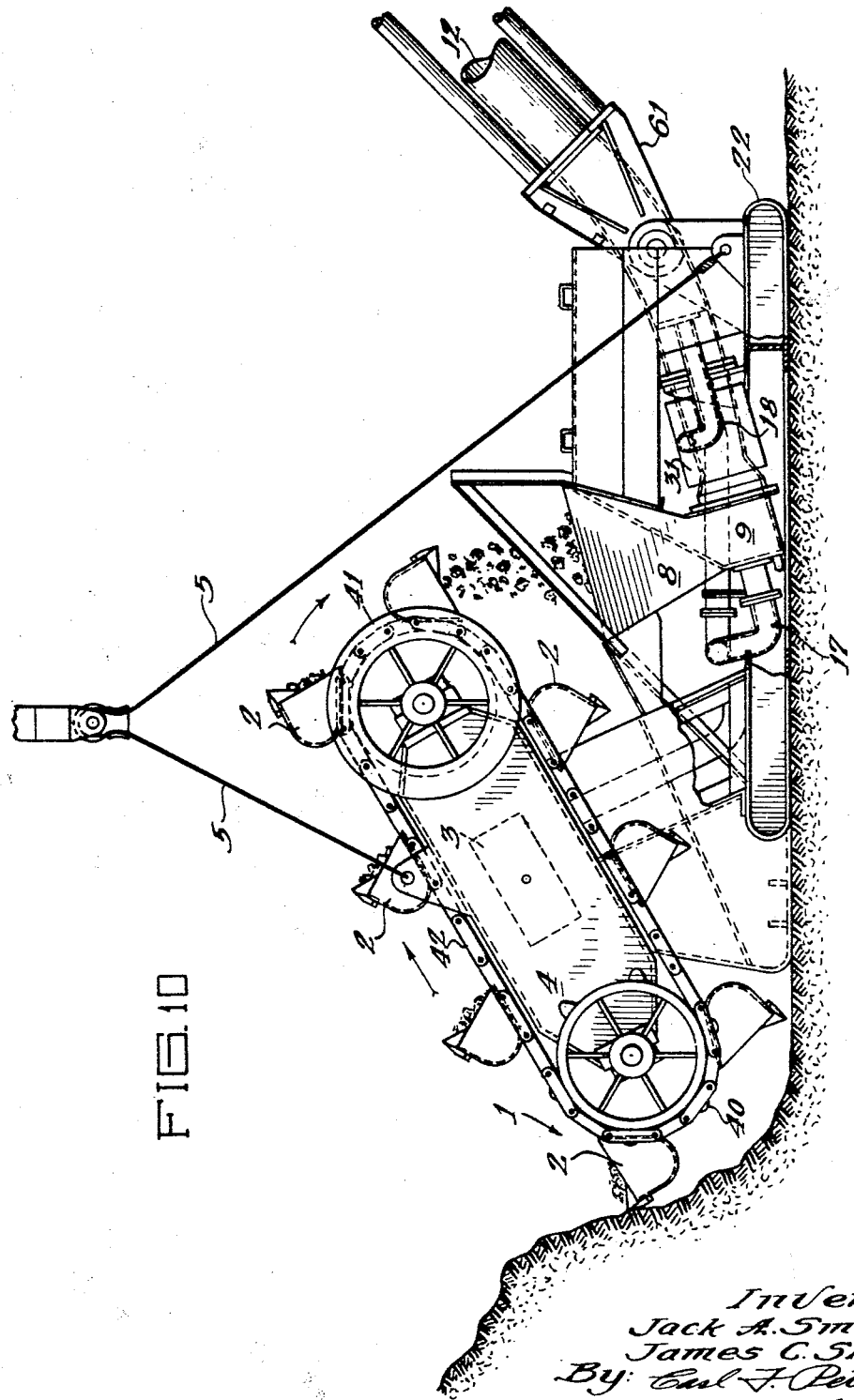

Nov. 28, 1961     J. C. SKAKEL ET AL     3,010,232
EXCAVATING, DREDGING, RAISING, AND TRANSMITTING
EARTHY AND OTHER LOOSE MATTER
Filed Oct. 8, 1959     7 Sheets-Sheet 7
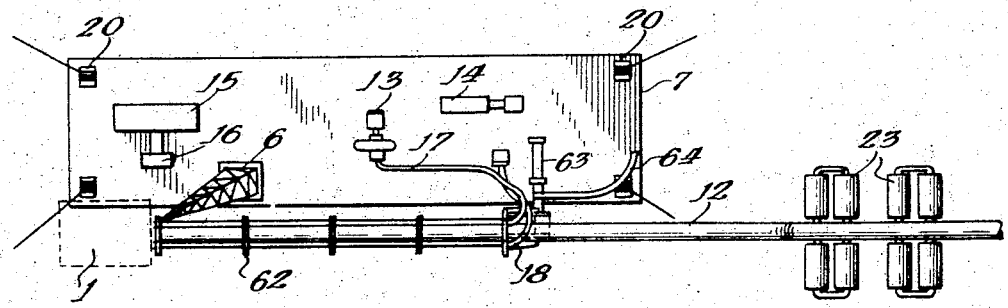
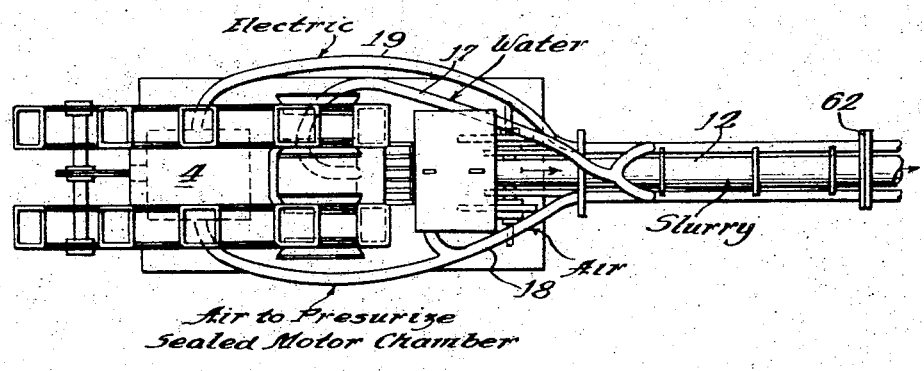
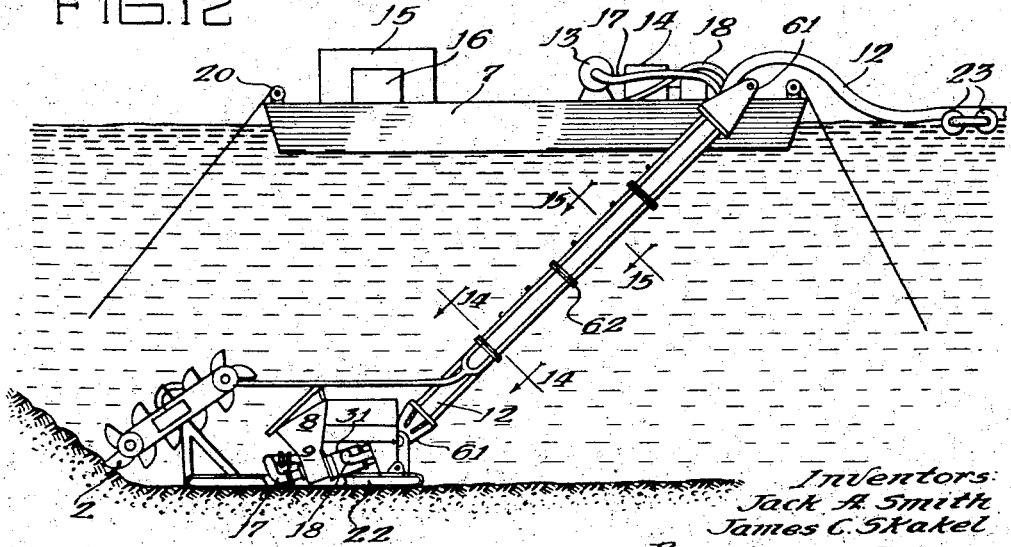

United States Patent Office 3,010,232
Patented Nov. 28, 1961

3,010,232
EXCAVATING, DREDGING, RAISING, AND TRANSMITTING EARTHY AND OTHER LOOSE MATTER
James C. Skakel, Greenwich, Conn., and Jack A. Smith, Detroit, Mich.; said Smith assignor to said Skakel
Filed Oct. 8, 1959, Ser. No. 845,283
25 Claims. (Cl. 37—195)

This invention relates to a new and improved dredging device or system for mining alluvial deposits, land reclamation and filling, channel construction and maintenance, and to sand and gravel production. This invention further relates to a new and improved device for classifying and separating said dredged materials. The invention further relates to improved processes for accomplishing the foregoing.

It is a particular object of this invention to move waterbound solids at high speed with high efficiency and at low cost. It is another object of this invention to provide dredging equipment which will, if desired, separate and classify dredged solids into different particle sizes. It is still another object of this invention to accomplish the foregoing at great depths or if so desired, at shallow depths. In the preferred embodiment of this invention the foregoing separation and classification steps will be accomplished under water, although they may also be accomplished above the surface of the water if desired.

For a complete understanding of the present invention, reference should be had to the attached drawings.

FIGURE 1 is an elevation view of a typical dredging system employed in the present invention.

FIGURE 2 is a plan view of a surface support, or barge employed in the present invention and of various devices placed thereon.

FIGURE 3 is a cross-sectional view of one form of hopper arrangement employed in the present invention and the hydraulic-pneumatic attachments therefor.

FIGURE 4 is a cross-sectional view of another hopper arrangement and the hydraulic attachments therefor.

FIGURE 5 is a cross-sectional view of yet another hopper arrangement and the hydraulic-pneumatic attachments therefor.

FIGURE 6 is a plan view of the various important components of the digging unit and the power driving means therefor.

FIGURE 7 is a cross-sectional view of the digging unit and the power driving means therefor taken along the lines 7—7 of FIGURE 6.

FIGURE 8 is a side elevational view of the driving unit taken through lines 8—8 of FIGURE 6.

FIGURE 9 is a top plan view showing the connections between the buckets and the bucket-drive chains.

FIGURE 10 is a detailed elevation view of the submerged digging unit-hopper assemblage of the present invention.

FIGURE 11 is a plan view of a surface supporting unit, with mechanical means for varying the position of a special conduit which may be employed in the present invention and also of various sections of the conduit itself and of supporting means therefor.

FIGURE 12 is an elevational view of a dredging device of the present invention when employing the special conduit system.

FIGURE 13 is a top view of various portions of FIGURE 12 showing particularly the paths of the various supply lines and the discharge pipe.

FIGURE 14 is a cross-sectional view taken across lines 14—14 of FIGURE 12 showing the means for coupling various lengths of the special conduit.

FIGURE 15 is a cross-sectional view of the special conduit pipe taken across lines 15—15 of FIGURE 12.

Referring now to the drawings in more detail, the invention consists in a combination of several devices including:

A. A digging device referred to generally as 1 comprising at least one relatively short endless chain of buckets 2 driven by a suitable prime mover 3 such as an electric motor or a diesel engine provided with a ventilation or breather pipe, said prime mover being enclosed in a watertight compartment 4. The digging device is suspended under water by suspension cables 5 from a crane 6 or similar device on a surface supporting unit or element 7 such as a barge or float on the surface of the water; or it may be similarly suspended from a dock or other stationary type support.

B. A transfer system including the moving chain of buckets aforementioned and additionally comprising a hopper 8 into which the aforesaid digging device 1 deposits the solids it has excavated, and a mixing or dispersing area 9 or several such areas in said hopper where the solids collect and where they are acted upon by a stream of water from one or more high speed hydraulic jet nozzle-type inlet openings 10 for the purpose of dispersing the solids uniformly into an aqueous slurry or pulp stream; and C. A discharging system in conjunction with the high-pressure hydraulic stream discussed above comprising a venturi-shaped discharge opening or exit means 11 substantially opposite said nozzle-type inlet to control the velocity of the hydraulic jet slurry stream and to assist in effecting the pick-up and transfer of the slurry, and a discharge pipe 12 leading to the desired site for depositing the dredged solid materials.

Optionally, and in the preferred embodiments of this invention, there are additionally provided as parts of this unique dredging device a classifying and separating system such as illustrated in FIGURE 5 and/or an auxiliary pneumatic stream entering the venturis by way of manifolds surrounding same, such also as shown in FIGURE 5, to provide additional pressure when discharging the dredged solids. This particular figure and the features thereof will be discussed in greater detail in another portion of the specification.

On the aforesaid dock, barge or other surface supporting facility 7 there is provided as previously mentioned a crane or hoist 6 for positioning the digging unit 1 by means of cables 5. There is also situated on said support unit or element A pump 13 with sufficient capacity to pump water at the desired velocity through the jet nozzle 10, hopper 8, venturi exit means 11 and discharge pipe 12. Optionally, for use in a preferred embodiment, an air compressor 14 having a requisite volume and pressure capacity to introduce a sufficient quantity of pneumatic energy to the slurry stream to assist in propelling the water-solids slurry to the desired location is also situated on said surface support unit. A generator 15 and engine 16 power unit combination to provide electric power to the submerged units will also generally be used on said surface support unit.

Operatively connected to the foregoing units are the connecting pipes 17 and 18 and cable 19 to introduce water, air and electric power, respectively, to the submerged units. The power units 15 and 16 can provide power for the pump and compressor as well as for the digging unit and may as aforesaid be an electrical generator-engine combination or it may be a diesel engine, or a steam engine, or an equivalent power source; or the power may be derived from an outside source particularly if the dredging is carried out near shore from a dock.

It should of course be recognized that there are many possible combinations for providing the necessary power so long as the motor driving the digging unit is submerged along with the digging unit. For example, an engine, generator and a main motor may be placed on the surface unit to provide the power necessary to drive the water and air pumps and auxiliary devices such as winches and anchors, etc., as well as to provide electricity for cable 19 to drive the submerged motor 3. Or, with the same general overall setup, instead of a submerged electric motor 3, a diesel engine having a breather pipe to the surface of the water may be employed. Or three submerged diesel engines all having breather pipes and all directly driving the compressed air, water and digging units may be employed along with an auxiliary diesel engine on the surface to drive the surface units such as the winches, etc. Submerged hydraulic motors may also be used as driving means for the digging buckets unit.

If the surface unit of the dredging system is a floating facility such as a barge, it is provided with sufficient winches 20, anchors 21 and propulsion and steering devices (not shown) as are required to facilitate moving of the barge in such a manner that proper control of the digging facilities can be maintained.

Referring now to the drawings in more detail, it will be noted in FIGURE 1 that the bucket digging unit or device referred to generally as 1, and the hopper 8 are mounted in a planned relative position to each other on a submerged digging unit base 22. The depth of all of these units and positioning of same are controlled by the raising or lowering or swinging about of cable 5 from crane 6. These features are shown in more detail in FIGURE 10.

It will be noted also from FIGURES 1 and 10 that cable 5 forms an inverted Y and that one branch of it goes to the digging unit 1 and the other branch goes to the base supporting unit 22. The angle that the base unit forms with the floor of the aqueous body as well as the angle of the digging buckets relative to the material being dredged may both be controlled by the tensioning and setting of these branches of cable 5 at their point of intersection.

Pipeline floats 23 are placed under discharge pipe 12 whenever the distances that the dredged material have to be pumped to the fill area warrant or require the use of same. It will be noticed in FIGURE 11 that such support means may comprise pairs of floating objects suitably joined by saddles which support the discharge pipe. A bulkhead 24 will generally be employed when the main purpose of the system of this invention is the building up of shoreline.

An important part of the present invention lies in the specific features of hopper 8, alternative designs thereof, the means for and method of injecting water into same and the means for discharging an aqueous solids slurry therefrom. Accordingly, particular reference should be made to FIGURES 3, 4, and 5 for a detailed explanation of the parts making up several typical hopper assemblages used in carrying out the teachings of the present invention and to FIGURES 1, 11, 12, 14 and 15 further illustrating various aspects of discharging devices and methods employed. The particular systems illustrated, however, are not the only arrangements within the scope of this invention, several other modifications thereof, such as hoppers with more or less compartments, being possible and contemplated and considered to be embraced within the main teachings of the invention.

At regular intervals the dredged materials from digging buckets 2 will empty over and into hopper 8. The hopper entrance may be and usually will be covered with a system of grizzly bars or a screen 25 having a very coarse mesh.

It will be noted in FIGURES 3, 4 and 5 that the hopper 8 is uniquely shaped and has a bottom base screen in the first or entry compartment 27 thereof which has a finer mesh than screen 25 and which screen is also angularly disposed to cause a gravitation of the material dropped in said entry compartment into a lower corner thereof. This base screen 26 of the first or entry compartment is perforated in order to permit part of the dredged material to pass therethrough and also to control the size of the dredged material passing therethrough. The lower end of said base and a wall 28 of the first or entry compartment intersect and define a classification zone for the dredged materials. This sidewall 28 is continuous for a small distance above its intersection with the base so as to act like a dam and help prevent dredged fine materials from going into compartment 29 (FIGURE 5) or to the floor of the aqueous body (FIGURES 3 and 4) rather than into compartment 30, where the fine materials are designed to go. Above this continuous portion of the sidewall is an opening of a size sufficient to permit the passage therethrough of all the rest of the solids which entered compartment 27 and to permit the channeling of relatively coarse materials into compartment 29 of the hopper of FIGURE 5 or to the floor of the aqueous body when employing the hoppers shown in FIGURES 3 and 4.

An alternative or additional method of preventing fines from going into compartment 29 or to the floor of the aqueous body is to cause screen 26 to vibrate or gyrate or both through an additional submerged motor drive. Or high powered water jets directed downwardly from the top of the hopper may also accomplish this. This problem would generally arise only when working with clay-like substances rather than with sand or gravel.

Another means of assuring proper classification, when classification is important, is to carry out supplemental classification at the surface of the water or at the depository site. The classification process would suffer if the screen 26 were coarser than the opening in sidewall 28 for then both coarse and fine dredged material would pass thru screen 26 and there would not be the desired separation. Larger solids therefore go into compartment 29 or to the floor of the aqueous body than are admitted into compartment 30. As typified by the hopper arrangement of FIGURE 5, there is thus provided an overall arrangement whereby undesired boulders, etc. are precluded by grizzly bars or screen 25 from entering the dredging system and also whereby two separate sizes of the initially classified dredged materials are channeled into different compartments for transfer to the desired locations. In this particular system grating 25 is designed to prevent the entry of materials larger than 12 inches, screen 26 to prevent the entry of materials larger than 2 inches, while the opening in sidewall 28 permits passage of anything admitted into compartment 27.

It will of course be appreciated that the hoppers shown in FIGURES 1, 10 or 12 may be any of the foregoing described types or they may simply be one compartment receptacles with no grating or screen whatsoever, or they may simply be one compartment receptacles with a single grating covering only the entrance, etc.

The hydraulic system comprises a water line or pipe 17 from the pump 13 and this line may of course be branched into two different streams such as shown in FIGURE 5 leading to inlets or nozzles both designated as 10 into the lower portions of compartments 29 and 30. These lower portions may be designated as mixing areas and it is in these areas where the slurries which are sent up the discharge pipes are created. The dredged solids, the high pressure pumped water and the water sucked into the system (which is generally about 40% of the total water) all go to make up the slurry. It will be noted that the cross-sectional areas of the streams of water at these inlets or nozzles are first sharply diminished and then relatively gradually expanded to assist in insuring that the water entering the compartments creates the desired turbulence in the dredged materials in the bottom of these compartments. Slurries of the dredged materials in the water are thus formed in each of the compartments and are then forced through venturi-shaped exit means or discharge openings 11 which are substantially directly opposite said nozzle type inlets. These venturi exit means have many of the same area characteristics as described for the nozzle inlet means but are of much larger dimension.

In carrying out the invention in an optional but generally preferred manner, air manifolds 31 surround each of the venturis and these manifolds receive air under pressure through air line or pipe 18 from the air compressor 14 on the barge or other surface device. The air received in the manofolds is transmitted through air holes 32 in the venturis into the water-solids slurry leaving each of the compartments. The flow of air materially assists in transferring the slurries to the desired locations.

FIGURE 3 shows a mechanical-hydraulic-pneumatic lifting hopper wherein a relatively simple classification operation by screens 25 and 26 and side wall 28 is carried out as compared to the hopper shown in FIGURE 5 or as compared to a hopper similar to that of FIGURE 5 but with more compartments. A hopper of this nature or like that shown in FIGURE 4 or similar hoppers even without screen 26 and an opening in the side wall 28 can be used where the depth and the speed of the dredging operation are of primary import, and classification secondary or even practically unnecessary except to prevent the blocking of the venturi exit means.

FIGURE 4 shows a mechanical-hydraulic lifting hopper without the pneumatic features shown in the hopper of FIGURE 3. It will be used where water pressure alone is sufficient to obtain the desired depth, speed, and yardage requirements.

FIGURES 6, 7, 8, 9 and 10 show various features of the digging unit and the drive means therefor, FIGURE 10 additionally showing its relation to other parts of the transfer and discharge systems.

FIGURES 6 and 7 show detailed plan and cross-sectional views of the digging unit. A submerged motor 3 which is enclosed in a water-tight compartment 4 drives shaft 33, coupled to speed reducer 34. Speed reducer 34 drives shaft 35 upon which is mounted drive sprocket 36. This sprocket drives driven sprocket 37 by means of sprocket drive chain 38. Driven sprocket 37 in turn drives the bucket drive shaft 39 which in turn drives two pair of bucket chain sprockets 40. Mounted around these bucket chain sprockets 40 and around idler pulleys 41 are bucket support chains 42 to which are attached the digging buckets 2.

The digging buckets 2 are attached to the support chains 42 by means of special chain links 43 which are cast as integral parts of the bucket, thus in effect making each bucket one link of each chain.

Attached to each bucket 2 is a replaceable digging lip 44, the lip being fastened to the bucket by means of bolts 45. These replaceable lips effectively increase the life of the bucket since the point of greatest wear is usually at the digging lip.

The water-tight compartment 4 is constructed of heavy steel plates 46 assembled by welding. Suitable strengthening webs and partitions 47, also assembled by welding, are included in the compartment structure. Manhole covers (shown partially at 48 in FIGURE 6) are bolted over several access manholes which permit entrance to compartment 4 for lubricating and repairing the drive mechanism. A fan to circulate air in the compartment is provided but not shown in the attached drawings. The circulated air is cooled by contact with the compartment walls, which in turn are cooled by the water in which the digging unit is immersed. A safety valve, also not illustrated, prevents air pressure in compart 4 from exceeding a predetermined level.

A control room is provided on the deck of the surface supporting unit 7 from which the dredge operator can control the speed of the bucket drive motor, the compressed air volume and pressure to both the venturi and the water-tight compartment, the lifting crane and operating mechanism for positioning the digging unit and the supply and exit pipes, and the motor driven winches for positioning and manipulating the surface supporting unit.

FIGURES 10, 11, 12, 13, 14 and 15 all show various features of a discharge apparatus which may be employed in the present invention. As disclosed in these figures, the discharge system may also have combined therewith, in a common conduit, means for conveying water and air to the hopper and for conveying electricity and air to the digging unit.

It will be noted in FIGURE 10 that several pipes enter into or lead away from the hopper system. The particular hopper employed in this figure utilizes pneumatic energy or air under pressure from pipe 18 to manifold 31 as well as hydraulic energy or water under pressure entering into hopper 8 from pipe 17. It will be additionally noted that these pipes or lines (as well as one for supplying electrical energy to motor 3 of digging unit 1) may all be centrally grouped such as shown to the right of this figure and such as is shown in more detail in other figures, particularly FIGURES 14 and 15 which will be described later.

FIGURE 13 is a top view of various units of the dredging system of the present invention showing the interrelationship of the various supply lines, discharge line, digging unit and hopper. This figure shows clearly that there are water, air and electric supply lines in the main conduit besides the discharge pipe 12 and also shows generally how these supply lines are branched and/or how they are connected to the various units of the device.

FIGURES 11 and 12 show further details of the various supply and discharge lines, particularly showing in FIGURE 12 the manner of connecting the conduit system to both the submerged unit and to the surface device and further particularly showing in FIGURE 11 the manner in which the conduit system may be shifted around in order that it be properly placed in connection with the placing of the digging unit. Conduit channeling and attaching member 61 of FIGURE 12 serves to orientate the various supply and discharge lines both at the digging unit and the surface unit as well as to mechanically link the conduit to each of these units. A cross section of the conduit system, taken across lines 15—15 is shown in FIGURE 15 and it will there be noticed that the unit typically consists of four canals surrounding and mechanically linked to the central discharge canal 12. Two of these canals are used for supplying water, one for an electric cable and one for compressed air. A brace 65 for the spider-like conduit is used to provide additional mechanical support. As illustrated in FIGURES 11 and 12 the conduit will usually consist in several sections or predetermined lengths. Coupling plates or flanges 62 shown in cross-section in FIGURE 14 are provided in order to join these sections. It will be noticed that these consist merely in flat plates which are joined together by inserting fastening means such as rivets or nuts and bolts through holes surrounding each of the supply canals and discharge pipe.

FIGURE 11 shows the means employed to support and suspend the conduit from the surface support unit 7. Mechanical arm or support member 63 is designed so that one end of it, to which the conduit is attached, will reach out over the water while the other end of it is suitably mounted to the surface supporting unit so as to be firmly attached thereto but yet free to move about the track 64 or other positioning means. It will be readily apparent from the foregoing described features of this figure and the aforedescribed crane-cable means of positioning the digging unit as well as the aforedescribed anchors, winches and steering devices, etc., that desired positioning of the dredging device of the present invention is very readily and efficiently accomplished.

The use of such a common conduit as has been described, in the place of mechanically independent lines for these various streams is optional, but is advantageous when dredging in rather shallow waters because easier control of the various lines is effected thereby. Because such a conduit is constructed in sections of limited length and because maximum friction occurs at junctures of these various sections, the use of such conduits in dredging in deep waters is relatively not as advantageous or as efficient as employing separate lines such as are shown in FIGURE 1.

The dredging system of the present invention can be operated successfully within a considerable range of sizes and speeds of the digging buckets, driving engines, hoppers, compressors and pumps. In any such varied system, however, the engines must be of sufficient power rating to operate the digging buckets and the compressors and pumps; and the hopper and exit pipe must be of sufficient size to handle the volume of solids delivered by the digging device.

Some of the advantages of the present invention include:

(1) Because the digging unit and hopper are suspended from the surface of the water by cables, this device can be used to move water-bound solids over a wider range of depths below the surface than is possible with other dredging devices.

(2) Because the driving engine or other prime mover is directly connected to the digging buckets, it is possible to use relatively few buckets thus greatly reducing the digging part of this device as compared, for example, to a ladder-type bucket dredge. This also makes it possible to excavate at fairly high speeds.

(3) Pump maintenance is at a minimum because no solids go through the pump. This also keeps the pump size at a minimum and reduces the power required for pump operation.

(4) Solids in excess of 50% by weight of the total slurry stream are quite possible and economically feasible.

(5) Induction of pneumatic energy into the solids slurry in the venturi section of this device greatly increases the depth range and efficiency of the system.

(6) Classification by particle size may be accomplished as desired at the entries of different compartments, with removal to the surface of any desired particle size.

(7) Due to the velocities attained at the hopper and venturi the system also becomes a scouring or washing device when used in the commercial processing of gravel or shells, eliminating separate washing operations.

(8) The effectiveness of positive digging combined with the flexibility of hydraulic transfer make this dredge unique in the mining of heavy ores from alluvial fields, sump holes, or placer deposits.

Referring once more to the hydraulic-pneumatic device illustrated in FIGURE 5 and other corresponding FIGURES, it should, of course, be recognized that the invention can be carried out successfully with a considerable range in the sizes of hoppers or compartments thereof, and the openings in the screens, jet nozzle type inlets, venturi discharge openings and the discharge pipes. In each case, the venturi discharge openings or exit means and the discharge pipes must be of sufficient size to transport the pulp or slurry stream of dredged materials and the water supplied by the jet nozzle inlets as well as the water sucked into the system. When utilizing the most preferred procedure, i.e. one employing pneumatic pressure as well as hydraulic pressure the air inlet holes of the venturi are sized and the manifold air pressure proportioned in such a manner that the air is introduced smoothly without cavitation into the slurry and without escaping back into the hopper. However, as previously stated, the overall process may sometimes be carried out and effectively operated without this pneumatic feature by omitting the air inlet holes in the venturi, the manifold and air inlet tubes. This is particularly true when the dredging depths are shallow.

It will be noted that as thus far illustrated, classification by particle size has been accomplished near the excavation point beneath the surface of the water and the desired size fractions separately lifted to the surface. It will be readily recognized that the classification may be postponed until the dredged material-water slurry reaches the surface, or that further classification may be carried out through the utilization of a similar hopper having the same general characteristics with even smaller screens.

To further illustrate the teachings of the present invention, specific operating details will now be discussed.

A barge 7 was built which was 35 feet wide, 110 feet long and 12 feet deep. On it were mounted two 1000 horsepower diesel engines 16; two 1200 kilowatt generators 15; a hydraulic pump 13 having a rated capacity of 4000 gallons per minute at a 300 foot head, driven by a 500 horsepower motor; two air compressors 14 each rated at 1500 cubic feet per minute at 50 pounds per square inch, both driven by a single 500 horsepower motor; a stiff-leg crane 6 of 75 tons' capacity; and four motor driven winches 20 for positioning and digging control. A digging unit 1 suspended from the crane comprised two endless bucket chains 42 each containing 8 buckets 2 of 8⅔ cubic feet capacity each, driven by a 200 horsepower electric motor 3 in a substantially water-tight, compressed air-filled compartment 4 attached on a common supporting base structure or digging unit base 22 with a hopper 8 containing an inlet water jet nozzle 10 and a multi-holed venturi discharge opening surrounded by a manifold or air mixing chamber 31. The exit end of the venturi led to a 20 inch diameter discharge pipe 12 and thence to the surface. A portion of the discharge pipe was supported over pipe line floats at the surface of the water thereby causing a typical sloping of said discharge pipe as illustrated in FIGURE 1. (It may sometimes be desired and more efficient to maintain the inclination of the discharge pipe at a substantially vertical or near vertical angle particularly in association with pneumatic attachments. Flexible pipes 17, 18, and 19 conduct water, compressed air, and an electric cable respectively, from the barge to the digging unit.

A hopper unit 8 was built which was approximately 10 feet high, 10 feet long, and 5 feet wide.

The hydraulic jet or nozzle-type inlet 10 leading into the hopper was 4 inches in diameter at the throat or at its most constricted portion, was 21 inches long and was 8 inches in diameter at its inlet end. The most constricted portion of the nozzle or throat was situated about 5 inches from the inlet end. The exit diameter of the nozzle was 6 inches. The venturi-shaped discharge opening 11 had an inlet diameter of 23 inches, was 46 inches long and discharged into a 20 inch diameter pipe. The diameter at the most constricted portion or throat of the venturi was 16 inches and this was situated 13 inches from the inlet. The venturi contained 14 rings of air inlet holes, each ring consisting of 66 equally spaced holes. The diameter of the holes was 0.1405 inch (#28 drill) and they were at right angles to the surface of the venturi exit cone. In a typical operation, the water velocity through the throat of the hydraulic jet nozzle-type inlet is up to 250 feet per second and the pump 13 which is driven by a 500 horsepower motor supplies water at the rate of nearly 6000 gallons per minute. Air is supplied by two Gardner-Denver radial type 6-cylinder compressors each rated at 1500 cubic feet per minute and 50 pounds per square inch pressure.

The above described unit transfers an approximate maximum of 2000 cubic yards of solids per hour lifted a vertical distance of at least 50 feet and transported through at least 1500 feet of pipe line.

As an alternative to the single jet nozzle 10 shown in the drawings, several nozzles may be used, preferably arranged in a circular "bundle" so as to converge the slurry streams at the throat of the venturi which produces a vortex or "swirling action."

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. A dredging system comprising in combination (1) a surface supporting element; (2) means on said surface supporting element for pumping water; and (3) means on said surface supporting element for raising and lowering a dredging unit; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into a portion thereof; the lower portion of said hopper comprising a mixing area having an inlet for receiving water under pressure from the water pump on said surface supporting element; and the lower portion of said hopper also having a venturi-discharge opening substantially opposite said inlet through which is forced an aqueous slurry of the dredged material dropped from said digging buckets.

2. A dredging system comprising in combination (1) a surface supporting element; (2) means on said surface supporting element for generating electricity; (3) means on said surface supporting element for pumping water; and (4) means on said surface supporting element for raising and lowering a dredging unit; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into a portion thereof; said submerged motor also being operatively connected to the means on said surface supporting element for generating electricity; the lower portion of said hopper comprising a mixing area having an inlet for receiving water under pressure from the water pump on said surface supporting element; and the lower portion of said hopper also having a venturi-discharge opening substantially opposite said inlet through which is forced an aqueous slurry of the dredged material dropped from said digging buckets.

3. A dredging system comprising in combination (1) a surface supporting element; (2) means on said surface supporting element for generating electricity; (3) means on said surface supporting element for pumping water; and (4) means on said surface supporting element for raising and lowering a dredging unit; said dredging unit comprising a base having mounted thereon a digging unit consisting of at least one endless chain of digging buckets operatively connected to a submerged driving motor encased in a substantially water-tight compartment and a collecting hopper separate from said digging unit and also mounted on said base in such a manner that the digging buckets discharge into a portion thereof; said submerged motor also being operatively connected to the means on said surface supporting element for generating electricity; the lower portion of said hopper comprising a mixing area having an inlet for receiving water under pressure from the water pump on said surface supporting element; and the lower portion of said hopper also having a venturi-discharge opening substantially opposite said inlet through which is forced an aqueous slurry of the dredged material dropped from said digging buckets.

4. A dredging system according to claim 1 wherein the surface supporting element floats and has winches, anchor cables and anchors for positioning means.

5. A dredging system according to claim 1 wherein the digging unit comprises two endless chains of digging buckets.

6. A dredging system according to claim 1 wherein the opening of said hopper is covered by a grating to exclude undesired, oversized solid dredged materials.

7. A dredging system according to claim 1 wherein the inlet into the hopper for the water received under pressure from the pump is nozzle-shaped.

8. A dredging system comprising in combination (1) a surface supporting element; (2) means on said surface supporting element for pumping water; (3) means on said surface supporting element for raising and lowering a dredging unit; and (4) means on said surface supporting element for compressing air; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into a portion thereof; the lower portion of said hopper comprising a mixing area having an inlet for receiving water under pressure from the water pump on said surface supporting element; and the lower portion of said hopper also having a venturi-discharge opening substantially opposite said inlet; said venturi-discharge opening also being surrounded by a manifold adapted to receive air under pressure from the means on said surface supporting element for compressing air and to transmit air under pressure by means of air holes in said venturi to the slurry of dredged material and water leaving said hopper.

9. A dredging system comprising in combination (1) a surface supporting element; (2) means on said surface supporting element for generating electricity; (3) means on said surface supporting element for pumping water; (4) means on said surface supporting element for raising and lowering a dredging unit; and (5) means on said surface supporting element for compressing air; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into a portion thereof; said submerged motor also being operatively connected to the means on said surface supporting element for generating electricity; the lower portion of said hopper comprising a mixing area having an inlet for receiving water under pressure for the water pump on said surface supporting element; and the lower portion of said hopper also having a venturi-discharge opening substantially opposite said inlet; said venturi-discharge opening also being surrounded by a manifold adapted to receive air under pressure from the means on said surface supporting element for compressing air and to transmit air under pressure by means of air holes in said venturi to the slurry of dredged material and water leaving said hopper.

10. A dredging system comprising in combination (1) a surface supporting element; (2) means on said surface supporting element for pumping water; and (3) means on said surface supporting element for raising and lowering a dredging unit; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into the entry thereof; the opening of said hopper being covered by a grating and said hopper also possessing a plurality of compartments, at least two of which are separated by a classifying screen, and the lower portion of at least one of which compartments possesses a mixing area having (a) an inlet for receiving water under pressure from the pump on said surface supporting element and (b) a venturi-discharge opening substantially opposite said inlet through which is forced an aqueous slurry of the classified dredged material dropped from said digging buckets.

11. A dredging system comprising in combination (1) a surface supporting element; (2) means on said surface supporting element for pumping water; (3) means on said surface supporting element for raising and lowering a dredging unit; and (4) means on said surface supporting element for compressing air; said dredging unit comprising a digging unit consisting of at least one endless chain of digging buckets operatively connected to a submerged driving motor encased in a substantially water-tight compartment and a collecting hopper separate from said digging unit and positioned in such a manner that the digging buckets discharge into the entry thereof; the opening of said hopper being covered by a grating and said hopper also possessing a plurality of compartments at least two of which are separated by a classifying screen, and the lower portion of at least one of which compartments possesses a mixing area having: (a) an inlet for receiving water under pressure from the pump on said surface supporting element; (b) a venturi-discharge opening substantially opposite said inlet; and (c) a manifold surrounding said venturi-discharge opening which is adapted to receive air under pressure from the means on said surface supporting element for compressing air and to transmit air under pressure by means of air holes in said venturi to the aqueous slurry of dredged material proceeding through said venturi exit means.

12. A mechanical-hydraulic device for classifying and pumping submerged solids comprising a multi-compartmented hopper for receiving said solids, a grating at the top of said hopper for excluding undesired, oversized, solid dredged materials, an entry compartment below said grating having a perforated sloping base one end of which is lower than the other end causing materials deposited in said entry compartment to gravitate toward the lower portion theereof, a side wall intersecting the lower end of said base, a portion of which side wall has an opening therethrough which serves as an entry into a second compartment of the hopper for relatively coarse materials, a third compartment whose top portion is the perforated sloping base of the entry compartment, water inlet means near the bottom of each of said second and third compartments, said means being nozzle-like and being adapted to transmit water under high pressure, and venturi-discharge openings substantially opposite said inlets through which are forced aqueous slurries of classified dredged material received in said compartments.

13. A mechanical-hydraulic-pneumatic device for classifying and pumping submerged solids comprising a hopper for receiving said solids, a grating at the top of said hopper for excluding undesired, oversized, solid dredged materials, water inlet means near the bottom of said hopper, said means being nozzle-like and being adapted to transmit water under high pressure, and a venturi-discharge opening substantially opposite said inlet; said venturi-discharge opening also being surrounded by a manifold adapted to receive air under pressure and also to transmit air under pressure by means of air holes in said venturi to the slurry of dredged material and water leaving said hopper.

14. A mechanical-hydraulic-pneumatic device for classifying and pumping submerged solids comprising a multi-compartmented hopper for receiving said solids, a grating at the top of said hopper for excluding undesired, oversized, solid dredged materials, an entry compartment below said grating having a perforated sloping base one end of which is lower than the other end causing materials deposited in said entry compartment to gravitate toward hte lower portion thereof, a side wall intersecting the lower end of said base, a portion of which side wall has an opening therethrough which serves as an entry into a second compartment of the hopper for relatively coarse materials, a third compartment whose top portion is the perforated sloping base of the entry compartment, water inlet means near the bottom of each of said second and third compartments, said means being nozzle-like and being adapted to transmit water under high pressure, and venturi-discharge openings substantially opposite said inlets, said venturi-discharge openings being surrounded by air manifolds adapted to receive air under pressure and also to transmit air under pressure by means of air holes in said venturis to the water-solid slurries passing through said venturi-discharge openings from said compartments.

15. A process for dredging and raising solid materials from the floor of an aqueous body which comprises (1) excavating said solid materials with a digging unit comprising at least one endless chain of digging buckets operatively connected to a submerged watertight digging motor, (2) loading the excavated solid materials into a submerged collecting hopper separate from said digging unit and positioned in a receiving location relative to said chain of digging buckets, and (3) pumping water under pressure through water inlet means in a mixing area in said hopper into said solid materials to cause a slurry thereof and also to cause said slurry to proceed through a venture-discharge opening substantially opposite the water inlet means of said hopper and up an exit pipe to a desired depository site.

16. A process for dredging and raising solid materials from the floor of an aqueous body which comprises: (1) excavating said solid materials with a digging unit comprising at least one endless chain of digging buckets operatively connected to a submerged watertight digging motor; (2) loading the excavated solid materials into a submerged collecting hopper separate from said digging unit and positioned in a receiving location relative to said chain of digging buckets; (3) pumping water under pressure through water inlet means in a mixing area in said hopper into said solid materials to cause a slurry thereof and also to cause said slurry to proceed through a multi-holed venturi-discharge opening substantially opposite the water inlet means of said hopper and up an exit pipe to a desired depository site; and (4) pneumatically accelerating the slurry proceding through the multi-holed venturi and up the inclined exit pipe by means of air pressure transmitted through said multi-holed venturi via a manifold surrounding and enclosing said multi-holded venturi.

17. A proceses according to claim 15 wherein the opening of said hopper is covered by a grating to exclude undesired, oversized solid dredged materials.

18. A process according to claim 16 wherein the opening of said hopper is covered by a grating to exclude undesired, oversized solid dredged materials.

19. A process for dredging, classifying and raising solid materials from the floor of an aqueous body which comprises: (1) excavating said solid materials with a digging unit comprising at least one endless chain of digging buckets operatively connected to a submerged watertight digging motor; (2) loading the excavated solid materials into a submerged collecting hopper separate from said digging unit and positioned in a receiving location relative to said chain of digging buckets, the opening of said hopper being covered by a grating and said hopper also possessing a plurality of compartments, at least two of which are separated by a classifying screen, and at least one of which compartments possesses a mixing area having: (a) a nozzle-type inlet for receiving and transmitting water under pressure; and (b) a venturi-discharge opening substantially opposite said inlet; and (3) pumping water under pressure through said nozzle-type inlet to cause a slurry of the dredged materials in the same compartment and also to cause said slurry to proceed through said venturi-discharge opening and up an exit pipe to a desired depository site.

20. A process for dredging, classifying and raising solid materials from the floor of an aqueous body which comprises: (1) excavating said solid materials with a digging unit comprising at least one endless chain of digging buckets operatively connected to a submerged watertight digging motor: (2) loading the excavated solid materials into a submerged collecting hopper separate from said digging unit and positioned in a receiving location relative to said chain of digging buckets, the opening of said hopper being covered by a grating, and said hopper also possessing a plurality of compartments, at least two of which are separated by a classifying screen, and at least one of which compartments possesses a mixing area having: (a) a nozzle-type inlet for receiving and transmitting water under pressure; (b) a multi-holed venturi discharge opening substantially opposite said inlet; and (c) a manifold surrounding said multi-holed venturi discharge opening adapted to receive and transmit air under pressure; (3) pumping water under pressure through said nozzle-type inlet to cause a slurry of the dredged materials in the same compartment and also to cause said slurry to proceed through said venturi-discharge opening and up an inclined exit pipe to a desired depository site; and (4) pneumatically accelerating the slurry proceeding through the multi-holed venturi and up the exit pipe by means of air pressure transmitted through said multi-holed venturi via said manifold surrounding and enclosing said multi-holed venturi.

21. A process for classifying and lifting submerged solids which comprises (A) loading the solids into a submerged multi-compartmented hopper which possesses (1) a grating at the top for excluding undesired, oversized solid materials; (2) an entry compartment below said grating having a perforated sloping base one end of which is lower than the other end causing materials deposited in said entry compartment to gravitate toward the lower portion thereof; (3) a side wall intersecting the lower end of said base, a portion of which side wall has an opening therethrough which serves as an entry into a second compartment of the hopper for relatively coarse materials; (4) a second compartment having the entry previously described: (5) a third compartment whose top portion is the perforated sloping base of the entry compartment; (6) water-inlet means near the bottom of each of said second and third compartments, said means being nozzle-like and being adapted to transmit water under high pressure; and (7) venturi exit means opposite said nozzle-type inlets; and (B) transmitting water under pressure through said nozzle-type inlets so as to create water-solid slurries in mixing areas in the bottoms of each of said second and third compartments and also to cause each of said slurries to proceed through said venturi exit means and up an exit pipe to a desired discharge site.

22. A process for classifying and lifting submerged solids which comprises (A) loading the solids into a submerged multi-compartmented hopper which possesses (1) a grating at the top for excluding undesired, oversized solid materials; (2) an entry compartment below said grating having a perforated sloping base one end of which is lower than the other end causing materials deposited in said entry compartment to gravitate toward the lower portion thereof; (3) a side wall intersecting the lower end of said base, a portion of which side wall has an opening therethrough which serves as an entry into a second compartment of the hopper for relatively coarse materials; (4) a second compartment having the entry previously described; (5) a third compartment whose top portion is the perforated sloping base of the entry compartment; (6) water-inlet means near the bottom of each of said second and third compartments, said means being nozzle-like and being adapted to transmit water under high pressure; (7) venturi exit means opposite said nozzle-type inlets, said venturis containing a plurality of holes therein and being adapted to receive and transmit air under pressure; and (8) air manifolds surrounding said multi-holed venturi-exit means and adapted to receive and transmit air under pressure; (B) transmitting water under pressure thru said nozzle-type inlets so as to create water-solid slurries in mixing areas in the bottoms of each of said second and third compartments; and (C) transmitting air under pressure into said manifolds and through said holes in said venturis, the combined action of said water pressure and said air pressure forcing each of said slurries proceeding thru said venturi exit means up an exit pipe to a desired discharge site.

23. A dredging system according to claim 9 wherein the connections from the electricity generating means, the water pumping means, the compressing air means and the discharge pipe from the hopper are grouped together in a common conduit system.

24. A mechanical-hydraulic device for classifying and pumping submerged solids comprising a compartment hopper for receiving said solids, a grating at the top of said hopper for excluding undesired, oversized, solid dredged materials, an entry compartment below said grating having a perforated sloping base one end of which is lower than the other end causing materials deposited in said entry compartment to gravitate toward the lower portion thereof, a side wall intersecting the lower end of said base, a portion of which side wall has an opening therethrough which serves as an exit means for relatively coarse materials from said entry compartment, and a second compartment whose top portion is the perforated sloping base of the entry compartment, water inlet means in a mixing area near the bottom of said second compartment, said means being nozzle-like and being adapted to transmit water under high pressure, and a venturi-discharge opening substantially opposite said inlet through which is forced an aqueous slurry of classified dredged material received in said compartment.

25. A mechanical-hydraulic-pneumatic device for classifying and pumping submerged solids comprising a compartmented hopper for receiving said solids, a grating at the top of said hopper for excluding undesired, oversized, solid dredged materials, an entry compartment below said grating having a perforated sloping base one end of which is lower than the other end causing materials deposited in said entry compartment to gravitate toward the lower portion thereof, a side wall intersecting the lower end of said base, a portion of which side wall has an opening therethrough which serves as an exit means for relatively coarse materials from said entry compartment, and a second compartment whose top portion is the perforated sloping base of the entry compartment, water inlet means in a mixing area near the bottom of said second compartment, said means being nozzle-like and being adapted to transmit water under high pressure, and a venturi-discharge opening substantially opposite said inlet, said venturi-discharge opening being surrounded by an air manifold adapted to receive air under pressure and also to transmit air under pressure by means of air holes in said venturi to the water-solid slurry passing through said venturi-discharge opening from said compartment.

References Cited in the file of this patent

UNITED STATES PATENTS

| Number | Name | Date |
| --- | --- | --- |
| 496,342 | Collins | Apr. 25, 1893 |
| 503,655 | Ellicott | Aug. 22, 1893 |
| 1,055,371 | Thorp | Mar. 11, 1913 |
| 1,149,989 | Thompson | Aug. 10, 1915 |
| 1,270,142 | Gage | June 18, 1918 |
| 1,554,076 | Engetrand | Sept. 15, 1925 |
| 1,758,047 | Jensen | May 13, 1930 |
| 2,044,088 | Lord | June 16, 1936 |
| 2,076,823 | Newell | Apr. 13, 1937 |
| 2,144,743 | Schulz | Jan. 24, 1939 |
| 2,178,265 | Peterson | Oct. 31, 1939 |
| 2,711,598 | Craggs | June 28, 1955 |